US012756723B2

(12) United States Patent
Lanham et al.

(10) Patent No.: US 12,756,723 B2
(45) Date of Patent: Oct. 6, 2026

(54) ENTITY CONTEXT-BASED SECURITY THREAT DETECTION BY A SECURITY ANALYTICS PLATFORM

(71) Applicant: Google LLC, Mountain View, CA (US)

(72) Inventors: Travis Lanham, Sunnyvale, CA (US); Saksham Agrawal, Bengaluru (IN); Komal Y, Bengaluru (IN); Vidhey Paluru, Hyderabad (IN); Michael Hom, Arlington, VA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 19/054,284

(22) Filed: Feb. 14, 2025

(65) Prior Publication Data

US 2026/0246787 A1 Aug. 20, 2026

(51) Int. Cl.
*H04L 9/40* (2022.01)
*G06F 16/215* (2019.01)

(52) U.S. Cl.
CPC ........ *H04L 63/1416* (2013.01); *G06F 16/215* (2019.01)

(58) Field of Classification Search
CPC ........................... H04L 63/1416; G06F 16/215
See application file for complete search history.

(56) References Cited

U.S. PATENT DOCUMENTS

| | | | | |
|---|---|---|---|---|
| 2020/0042857 | A1* | 2/2020 | Fang | G06N 3/08 |
| 2025/0259075 | A1* | 8/2025 | Crabtree | G06F 16/3344 |
| 2025/0339220 | A1* | 11/2025 | Brubaker | A61B 34/10 |
| 2025/0373647 | A1* | 12/2025 | Bazak | G06F 21/577 |
| 2025/0379878 | A1* | 12/2025 | Guha | H04L 63/1425 |
| 2025/0390352 | A1* | 12/2025 | Crabtree | G06F 9/5027 |
| 2026/0017386 | A1* | 1/2026 | Ohayon | G06F 21/577 |
| 2026/0073058 | A1* | 3/2026 | Mogali | G06F 21/577 |
| 2026/0111769 | A1* | 4/2026 | Varanasi | G06N 5/04 |

* cited by examiner

*Primary Examiner* — Mohammad A Siddiqi
(74) *Attorney, Agent, or Firm* — Lowenstein Sandler LLP

(57) ABSTRACT

Aspects of the disclosure are directed to entity context-based security threat detection by a security analytics platform. A plurality of heterogeneous data items associated with a specified enterprise computing environment can be received by one or more processing devices of a security analytics platform. An entity context data structure comprising a plurality of vertices connected by a plurality of edges can be generated based on the plurality of heterogeneous data items. Telemetry data associated with the specified enterprise computing environment can be received. Context data comprising a plurality of context data items associated with at least a subset of entities referenced by the telemetry data can be extracted from the entity context data structure. One or more security outcomes can be produced by applying a set of detection rules to the telemetry data and the context data.

17 Claims, 8 Drawing Sheets

ENTITY CONTEXT-BASED SECURITY THREAT DETECTION BY A SECURITY ANALYTICS PLATFORM

TECHNICAL FIELD

Aspects and implementations of the present disclosure relate generally to cloud-based cybersecurity analytics platforms. In particular, aspects and implementations of the present disclosure relate to entity context-based security threat detection by a security analytics platform.

BACKGROUND

In today's digital age, organizations are constantly facing an increasing volume of sophisticated cybersecurity threats. Cybersecurity is the practice of protecting systems, networks, and data from digital attacks, unauthorized access, and damage. Traditional cybersecurity measures are often inadequate in providing comprehensive protection against such threats, which has resulted in the proliferation of large numbers of disparate cybersecurity operations tools such as Security Orchestration, Automation, and Response (SOAR) platforms, Security Information and Event Management (SIEM) systems, Intrusion Detection Systems (IDS), Intrusion Prevention Systems (IPS), antivirus software, endpoint protection, vulnerability management tools, and more. These platforms and systems can generate multiple alerts for each detection of a security threat. Because not all security threats are of equal importance, it can be challenging to sift through a large quantity of security threats. Analyzing and acting upon the staggering volume of security threats generated by such an ever-increasing number of cybersecurity operations tools is complex and cumbersome, leading to inefficiencies and vulnerabilities.

SUMMARY

The below summary is a simplified summary of the disclosure in order to provide a basic understanding of some aspects of the disclosure. This summary is not an extensive overview of the disclosure. It is intended neither to identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

An aspect of the disclosure provides a method comprising receiving, by one or more processing devices of a security analytics platform, a plurality of heterogeneous data items associated with a specified enterprise computing environment. The method further comprises generating, based on the plurality of heterogeneous data items, an entity context data structure comprising a plurality of vertices connected by a plurality of edges, wherein each vertex of the plurality of vertices corresponds to an entity of a plurality of entities and each edge corresponds to a relationship between a first vertex and a second vertex connected by the edge. The method further comprises receiving telemetry data associated with the specified enterprise computing environment. The method further comprises extracting, from the entity context data structure, context data comprising a plurality of context data items associated with at least a subset of entities referenced by the telemetry data. The method further comprises producing one or more security outcomes by applying, to the telemetry data and the context data, a set of detection rules.

In some implementations, the one or more security outcomes comprise at least one of a detection of a potential security threat, an event within the specified enterprise computing environment, an alert, or a remedial action.

In some implementations, the method further comprises generating, based on the one or more security outcomes, one or more alerts.

In some implementations, the plurality of heterogeneous data items comprises at least one of a log data item associated with one or more entities of the specified enterprise computing environment, a security operations data item associated with the one or more entities of the specified enterprise computing environment, a security intelligence data item associated with the one or more entities of the specified enterprise computing environment, or an informational data item associated with the one or more entities of the specified enterprise computing environment. In some implementations, the security intelligence data item characterizes at least one of a security detection identifying a potential security threat, a security watch list, a security breach indicator, an investigation operation, or one or more remediation operations.

In some implementations, generating the entity context data structure further comprises de-duplicating a subset of the plurality of heterogeneous data items associated with a specified entity.

In some implementations, generating the entity context data structure further comprises merging a subset of the plurality of heterogeneous data items associated with a specified entity.

In some implementations, generating the entity context data structure further comprises validating a subset of the plurality of heterogeneous data items.

In some implementations, generating the entity context data structure further comprises cross-validating a first subset of the plurality of heterogeneous data items and a second subset of the plurality of heterogeneous data items.

Another aspect of the disclosure provides a system comprising a memory and a processing device coupled to the memory, configured to perform operations comprising receiving, by one or more processing devices of a security analytics platform, a plurality of heterogeneous data items associated with a specified enterprise computing environment. The processing device is further configured to perform operations comprising generating, based on the plurality of heterogeneous data items, an entity context data structure comprising a plurality of vertices connected by a plurality of edges, wherein each vertex of the plurality of vertices corresponds to an entity of a plurality of entities and each edge corresponds to a relationship between a first vertex and a second vertex connected by the edge. The processing device is further configured to perform operations comprising receiving telemetry data associated with the specified enterprise computing environment. The processing device is further configured to perform operations comprising extracting, from the entity context data structure, context data comprising a plurality of context data items associated with at least a subset of entities referenced by the telemetry data. The processing device is further configured to perform operations comprising producing one or more security outcomes by applying, to the telemetry data and the context data, a set of detection rules.

In some implementations, the processing device is further configured to perform operations comprising generating, based on the one or more security outcomes, one or more alerts.

In some implementations, generating the entity context data structure further causes the processing device to perform operations comprising de-duplicating a subset of the plurality of heterogeneous data items associated with a specified entity.

In some implementations, generating the entity context data structure further causes the processing device to perform operations comprising merging a subset of the plurality of heterogeneous data items associated with a specified entity.

In some implementations, generating the entity context data structure further causes the processing device to perform operations comprising validating a subset of the plurality of heterogeneous data items.

In some implementations, generating the entity context data structure further causes the processing device to perform operations comprising cross-validating a first subset of the plurality of heterogeneous data items and a second subset of the plurality of heterogeneous data items.

Another aspect of the disclosure provides a non-transitory computer readable storage medium comprising instructions that, when executed by a processing device, cause the processing device to perform operations comprising receiving, by one or more processing devices of a security analytics platform, a plurality of heterogeneous data items associated with a specified enterprise computing environment. The instructions, when executed by the processing device, further cause the processing device to perform operations comprising generating, based on the plurality of heterogeneous data items, an entity context data structure comprising a plurality of vertices connected by a plurality of edges, wherein each vertex of the plurality of vertices corresponds to an entity of a plurality of entities and each edge corresponds to a relationship between a first vertex and a second vertex connected by the edge. The instructions, when executed by the processing device, further cause the processing device to perform operations comprising receiving telemetry data associated with the specified enterprise computing environment. The instructions, when executed by the processing device, further cause the processing device to perform operations comprising extracting, from the entity context data structure, context data comprising a plurality of context data items associated with at least a subset of entities referenced by the telemetry data. The instructions, when executed by the processing device, further cause the processing device to perform operations comprising producing one or more security outcomes by applying, to the telemetry data and the context data, a set of detection rules.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
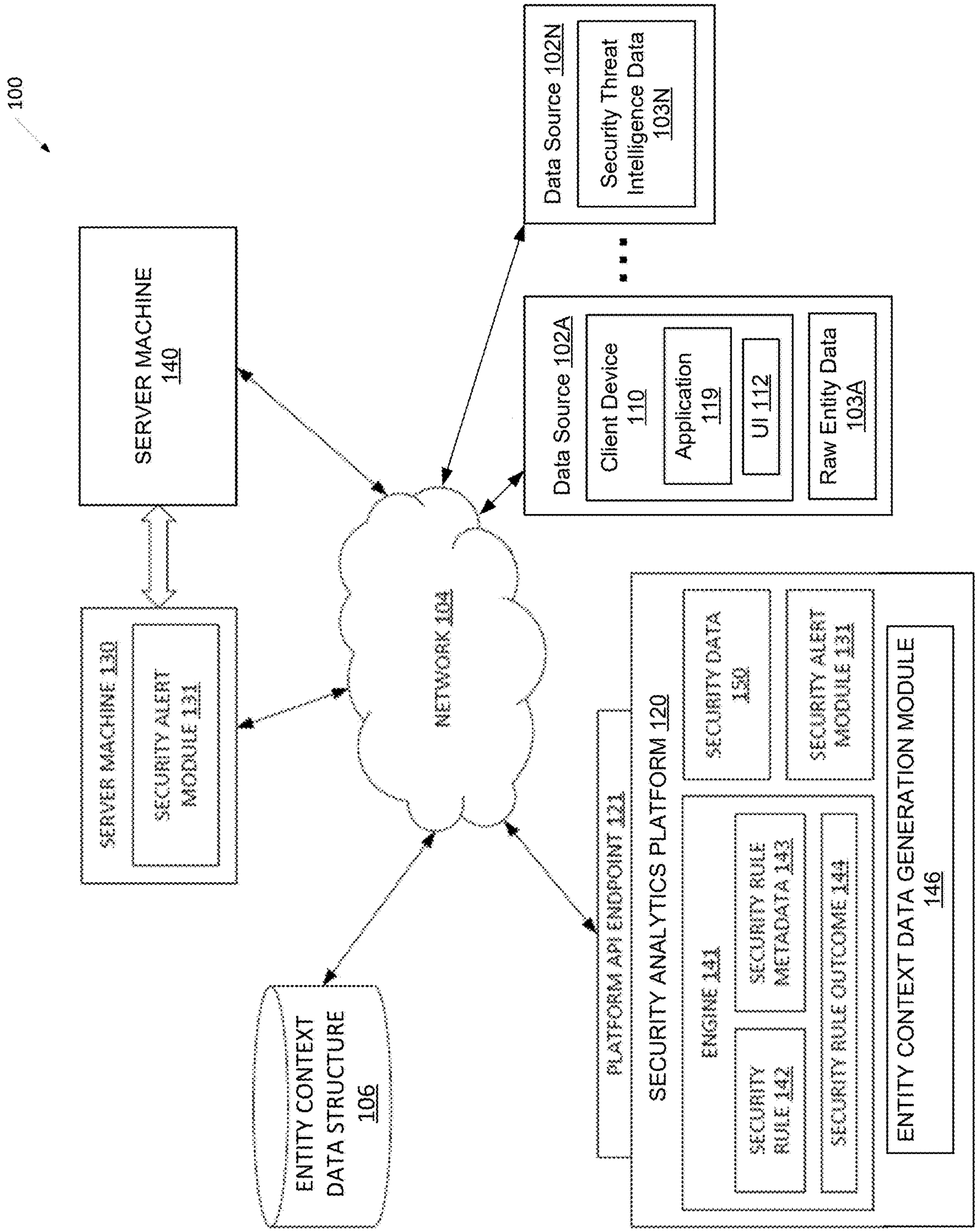
FIG. 1 illustrates an example system architecture, in accordance with implementations of the present disclosure.

Aspects of the present disclosure are related to entity context-based security threat detection by a security analytics platform. The security analytics platform can be an online (e.g., virtual) platform that provides its clients (e.g., represented by entities such as organizations) with a comprehensive suite of productivity tools, programs, and services directed to various aspects of cybersecurity. In some implementations, a security analytics platform can combine various features of a security information and event management (SIEM) system and/or a security orchestration, automation, and response (SOAR) system.

The client organization can provide security data to the security analytics platform. As used herein, security data can include telemetry data such as log files produced by the operating systems, middleware, and/or applications that reflect actions which occurred at specific moments in time on a computing resource. Once the security analytics platform receives the data from the client organization, the client organization can use the tools or services of the security analytics platform to perform security actions with the ingested data. The security analytics platform can provide a user (e.g., a systems administrator) from the client organization with a graphical user interface (GUI) to access and use the tools and functionality of the security analytics platform.

The security actions of the security analytics platform can generate one or more of events, detections, or alerts based on the ingested data. Some security analytics platforms can provide notifications based on the events, detections, or alerts that are generated.

In some instances, the frequency or quantity of events, detections, or alerts that are generated by the security analytics platform can be configured by the client organization. For example, a client organization can prioritize alerts that are triggered by accessing a certain resource. However, some alerts when viewed or analyzed in isolation may not be indicative of a security threat, but when analyzed in connection with additional alerts, detections, events, or other security data the combined dataset may indicate a potential security threat to the client organization using the security analytics platform. Furthermore, in some instances, lower-priority detections may not trigger an alert (in order to reduce the number of alerts provided to a client organization). Alternatively, detections may trigger an alert, but the alert can be suppressed based on a certain alert threshold condition (e.g., by the security analytics platform or client organization) in favor of alerts that have satisfied the certain alert threshold condition. These or similar configurations can allow a sophisticated malicious actor to perform multiple lower-threat activities that may go undetected to accomplish their goal to breach and/or compromise a computing environment of the client organization.

Aspects of the present disclosure address the above noted and other deficiencies by implementing entity context-based security threat detection by a security analytics platform.

In some implementations, a security analytics platform can receive and ingest security data associated with a specified enterprise computing environment (e.g., an enterprise computing environment of a client of the security analytics platform). The security data can include multiple heterogeneous data items (e.g., log data items, security operations data items, security intelligence data items, and/or informational data items associated with one or more entities of the enterprise computing environment). Ingesting the received security data may involve various data deduplicating, data merging, and/or data validation operations.

Based on the ingested security data, the security analytics platform can generate an entity context data structure (e.g., an entity context graph) that describes the security context of various entities of the enterprise computing environment. Examples of such entities include a user associated with the enterprise computing environment, a network address associated with the enterprise computing environment (e.g., an IP address, a MAC address, etc.), a computing resource associated with the enterprise computing environment (e.g., a server), and/or an informational resource associated with the enterprise computing environment (e.g., a database or a document). The entity context graph can include multiple vertices connected by edges, such that each vertex can correspond to an entity of the enterprise computing environment, while each edge can denote a relationship between the pair of vertices connected by the edge. In an illustrative example, an entity "user A" may be in a relationship "being a member of" of an entity "user group B." In an illustrative example, an entity "IP address 192.168.1.100" may be in a relationship "assigned to" with an entity "network interface ABC." Thus, the context entity graph can be viewed as a hierarchical database of security-related information for the enterprise computing environment. Querying the database by traversing the graph allows efficiently executing various queries on the enterprise security data (e.g., identifying all users who have access to a given network resource, etc.). Irrespective of analogizing the context entity graph with a hierarchical database, various types of data structures, including, e.g., relational database tables, can be employed for storing the entity context data structures described herein.

The security analytics platform may efficiently utilize the context entity graph for producing various security outcomes, including events (e.g., changes of a state of an entity), detections (e.g., of a security threat), alerts (e.g., of a security threat), corrective actions to be performed (e.g., a modification of a configuration of an entity), etc.

In an illustrative example, the security analytics platform may, upon receiving telemetry data associated with the enterprise computing environment (e.g., real-time telemetry data or a batch of telemetry data items pertaining to a certain time window), extract, from the entity context data structure, security context data items associated with at least some entities referenced by the telemetry data. Then, the security analytics platform may apply, to the received telemetry data and the extracted security context data, a set of detection rules in order to produce one or more security outcomes.

In some implementations, a security rule can define one or more actions to be performed upon successfully evaluating one or more logical conditions specified by the rule. Accordingly, when a security rule is applied to one or more security data items, the logical conditions specified by the security rules are evaluated on those data items. If the logical conditions are satisfied, the action(s) specified by the security rule are performed, thus producing the security outcome.

For example, security data can reflect that a user has attempted to login to a service provided by the client organization ten times in the past five minutes. A security rule can include a logical condition regarding the maximum allowed number of login attempts within a certain time period (e.g., ten login attempts in five minutes), and an action to be performed responsive to the number of login attempts exceeding the specified threshold (e.g., preventing the user from login attempts for ten minutes).

In some implementations, security rules can be chained together, such that the outcome of the final rule of the chain can be used to perform a security action, while each intermediate outcome (e.g., from rules within the chain) can be augmented by the relevant entity context data and fed to the next rule in the chain.

In some implementations, the detections produced by the security analytics platform can be presented to the client organization through a graphical user interface (GUI) and/or various other communication channels (e.g., electronic mail, instant messages, etc.). In an illustrative example, the security analytics platform can generate one or more alerts based on a security threat detection and visually render the generated alerts via a GUI.

Advantages of implementing entity context-based security threat detection by a security analytics platform include improving detection quality, reducing security threat notification clutter, reducing unnecessary alerts provided to the client organization, and improving the configurability of security rules for the client organization. Such improvements can lead to the overall improved security of the computing environment of the client organization through improved functionality of the security analytics platform tools and features available to clients.

FIG. 1 illustrates an example of a system 100, in accordance with aspects of the disclosure. The system 100 includes data sources 102A-N, an entity context data structure 106, a security analytics platform 120, and one or more server machines 130-140 connected via network 104. In some implementations, system 100 can include one or more other platforms (not illustrated).

In some implementations, network 104 can include a public network (e.g., the Internet), a private network (e.g., a local area network (LAN) or wide area network (WAN)), a wired network (e.g., Ethernet network), a wireless network (e.g., an 702.11 network or a wireless fidelity (Wi-Fi) network), a cellular network (e.g., a Long Term Evolution (LTE) network), routers, hubs, switches, server computers, and/or a combination thereof.

System 100 can include a plurality of data sources, such as data sources 102A-N. While two data sources are illustrated in FIG. 1, system 100 can support more (or fewer) data sources. In some implementations, data source 102A can correspond to an enterprise computing environment that is associated with a plurality of entities (e.g., users associated with the enterprise computing environment, network addresses associated with the enterprise computing environment, computing resources associated with the enterprise computing environment, informational resources associated with the enterprise computing environment). Data source 102A can generate the raw entity data that describes each entity associated with the enterprise computing environment (e.g., raw entity data 103A). The raw entity data that pertains to entities can be stored in one or more log files. In some implementations, a plurality of log files can contain raw entity data that pertains to the same entity.

In some implementations, data source 102N can correspond to an external source, such as a global threat intelligence data repository. The external source can include security threat enrichment data (e.g., security threat intelligence data 103N), such as global threat intelligence data and global indicators of compromise (IOCs). While data sources 102A-N are described herein as being organizations and global threat intelligence data sources, the system 100 can include additional and/or alternative data sources.

In some implementations, data sources 102A-N can include one or more client device(s), such as client device 110 of data source 102A. The client device 110 can include a type of computing device such as a desktop personal computer (PCs), laptop computer, mobile phone, tablet computer, netbook computer, wearable device (e.g., smart watch, smart glasses, etc.) network-connected television, smart appliance (e.g., video doorbell), any type of mobile device, etc. In some implementations, the client device 110 can be one or more computing devices (such as a rackmount server, a router computer, a server computer, a personal computer, a mainframe computer, a laptop computer, a tablet computer, a desktop computer, etc.), data structures (e.g., hard disks, memories, databases), networks, software components, or hardware components. In some implementations, the client device(s) is also referred to herein as a "user device".

The data that is collected from the client devices that are associated with the data sources 102A-N can be transmitted, via the network 104, to one or more components of the system 100 for further analysis. In some implementations, the data that is collected from the data sources 102A-N can be transmitted to server machine 140 and/or the entity context data generation module 146 of the security analytics platform 120. The entity context data generation module 146 can determine one or more log files that contain raw entity data that pertains to the same entity. The contextual data generation module 146 can perform data merging, data de-duplication, and data validation operations on the one or more log files that contain raw entity data that pertains to the same entity. A data merging operation can include coalescing, for each entity, all of the raw entity data that pertains to the entity (e.g., into a single log file). A data de-duplication operation can include retaining, in a log file that contains the raw entity data that pertains to a specific entity, a first instance of the duplicate raw entity data and removing subsequent iterations of the duplicate raw entity data. A data validation operation can include determining a plurality of validity intervals, where each validity interval corresponds to a time interval during which raw entity data associated with the entity is available. In some implementations, the raw entity data that is associated with a validity interval can be considered validated raw entity data. In some implementations, the first instance of duplicate raw entity data that is retained (e.g., following data merging operations and/or data de-duplication operations) can be considered cross-validated raw entity data.

The contextual data generation module 146 can generate contextual data that further enriches the raw entity data that pertains to each entity. The contextual threat detection information pertaining to an entity can provide a comprehensive overview of the entity. For example, the contextual threat detection information can include temporal entity data, such as a timestamp that indicates when the entity is first detected in the organization computing environment, a timestamp that indicates the most recent detection of the entity in the organization computing environment, a timestamp that indicates the last time the entity is detected in the organization computing environment. The contextual threat detection information can further indicate the prevalence of the entity. In some implementations, the prevalence of the entity can indicate a degree of interaction between the entity and one or more other entities within the organization computing environment. For example, the prevalence of the entity can include a number of times the entity is accessed (e.g., when the entity is an organization resource, network address, etc.), a number of times the entity accesses another entity (e.g., when the entity is a user associated with the organization), etc. The contextual threat detection information can also identify one or more other entities within the organization computing environment with which the entity interacts. For example, if the entity is a user, then the contextual threat detection information can identify network resources that the user is authorized to access, network addresses that the user owns (e.g., based on information that indicates users, owners, and/or assignees of Internet-based entities (WHOIS information)), etc. Additionally or alternatively, if the entity is a network resource and/or network address, then the contextual threat detection information can identify the users associated with the organization that are authorized to access the network resources and/or network address. In some implementations, the contextual threat detection information can include threat intelligence data that is specific to each entity. For example, each type of entity (e.g., user, network resource, network address, etc.) can face different indicators of compromise (IOCs), be subject to different types of security threats, etc. The different IOCs and/or security threats facing each entity can be indicated in the security threat enrichment data that is received from data sources outside of the organization, for example.

The contextual data generation module 146 can generate the entity context data structure 106 (e.g., a context entity graph) based on the raw entity data and the contextual data associated with each entity. The entity context data structure can contain a plurality of vertices and a plurality of edges connecting the plurality of vertices. Each vertex can correspond to an entity. An edge can connect a pair of vertices and indicate the relationship between the entities represented by the pair of vertices. The entity context data structure 106 can be stored in a memory of the system 100.

The memory can be a persistent storage that is capable of storing data that pertains to organization entities. In some implementations, the memory can store one or more data items and data structures for tagging, organizing, and indexing the data items. A data item can include various types of data including structured data, unstructured data, vectorized data. In some implementations, a data item can be a digital file that includes, for example, text data, audio data, image data, video data, multimedia, interactive media, data objects, digital resources, etc. An example of a data item can include files (e.g., log files), database records, database entries, programming code or documents, etc.

In some implementations, the memory can include one or more storage devices, such as main memory, magnetic or optical storage-based disks, tapes or hard drives, network-attached storage (NAS), storage area network (SAN), etc. In some implementations, the memory can be a network-attached file server. Additionally or alternatively, the memory can be another type of persistent storage (e.g., an object-oriented database, a relational database, etc.) that can be hosted by the security analytics platform 120 and/or one or more different machines coupled to the server hosting the security analytics platform 120 via the network 104.

In some implementations, the organization (e.g., one of data sources 102A-N) can access the entity context data structure 106 via one or more client devices (e.g., client device 110 of data source 102A). In some implementations, the client device 110 can use an application (e.g., application 119) to access the entity context data structure 106 from a memory of the system 100. The client device 110 can use the entity context data structure 106 to perform threat detection on the entities associated with the organization. In some implementations, client device 110 can communicate with security analytics platform 120 to perform threat detection.

In some implementations, the client device 110 can implement or include one or more applications, such as application 119, to communicate (e.g., send and receive information) with the security analytics platform 120. The application 119 can implement user interfaces (UIs) (e.g., graphical user interfaces (GUIs)), such as UI 112. In some implementations, the UI 112 can be a webpage that is rendered by a web browser and displayed on the client device 110 in a web browser window. In some implementations, the UI 112 can be included in a stand-alone application that is downloaded to the client device 110 and that runs on the client device 110 (also referred to as a "native application" or "native client application" herein). In some implementations, engine 141 can be implemented as part of the application 119. In other implementations, engine 141 can be separate from the application 119 and the application 119 can interface with engine 141.

The client device 110, when connected to the security analytics platform 120, can present (e.g., display) a UI (e.g., UI 112) to a user of the respective client device through an application (e.g., application 119). The client device 110 can also collect input from users through input features.

In some implementations, the UI 112 can include various visual elements (e.g., UI elements) and regions. The UI 112 can be a mechanism by which the user engages with the security analytics platform 120 and the system 100. In some implementations, the UI 112 of the client device 110 can include multiple visual elements and regions that enable the presentation of information (e.g., for decision-making, content delivery) at the client device 110. In some implementations, the UI 112 can be GUI.

In some implementations, the UI 112, and/or the client device 110 generally, can include input features to intake information from the client device 110. In one or more examples, a user of the client device 110 can provide input data (e.g., a user query, control commands, etc.) into an input feature of the UI 112 or the client device 110, for transmission to the security analytics platform 120. Input features of UI 112 and/or client device 110 can include space, regions, and/or elements of the UI 112 that accept user inputs. For example, input features may include visual elements (e.g., GUI elements) such as buttons, text-entry spaces, selection lists, drop-down lists, etc. For example, in some implementations, input features may include a chat box which a user of the client device 110 can use to input textual data (e.g., a user query). The application 119 can transmit the textual data to the security analytics platform 120 for further processing. In some implementations, the data stored in the entity context data structure 106 can be used to provide a response to the user query.

In some implementations, the client device 110 can access the security analytics platform 120 through network 104 and using one or more application programming interface (API) calls via platform API endpoint 121. In some implementations, the security analytics platform 120 can include multiple platform API endpoints through which services, functionalities, and/or information on the security analytics platform 120 can be provided to the client device 110. The platform API endpoint 121 can be one end of a communication channel and the other end can be another system, such as the client device 110 that is associated with a user account. The platform API endpoint 121 can include or be accessed using a resource locator, such a universal resource identifier (URI) and/or a universal resource locator (URL) of a server or service. The platform API endpoint 121 can receive requests from other systems and, in some implementations, return a response with information responsive to the request. In some implementations, HTTP (Hypertext Transfer Protocol), HTTPS (Hypertext Transfer Protocol Secure) methods (e.g., API calls) can be used to communicate with the platform API endpoint 121.

The platform API endpoint 121 can be, for example, a Representational State Transfer (REST) API, a GraphQL API, a Simple Object Access Protocol (SOAP) API, etc. In some implementations, the security analytics platform 120 can make available (e.g., via an API), a set of API resources that can be used for requesting different actions, inspecting data (e.g., raw entity data), and/or otherwise interacting with the security analytics platform 120. In some implementations, a REST API and/or another type of API can work according to an application layer request and response model. An application layer request and response model can use HTTP, HTTPS, SPDY, or any suitable application layer protocol. An HTTP-based protocol is described for purposes of illustration, rather than limitation. The disclosure should not be interpreted as being limited to the HTTP protocol. HTTP requests (or any suitable request communication) to the security analytics platform 120 can observe the principals of a RESTful design or the protocol of the type of API. RESTful is understood in this document to describe a Representational State Transfer architecture. The RESTful HTTP requests can be stateless, thus each message that is communicated contains all necessary information for processing the request and generating a response. The platform API can include various resources, which can act as endpoints that can specify requested information or requested actions. The resources can be expressed as URI's or resource paths. The RESTful API resources can additionally be responsive to different types of HTTP methods, such as GET, PUT, POST and/or DELETE.

In some implementations, any element of system 100, such as server machine 130, server machine 140, and/or entity context data structure 106, can include a corresponding API endpoint for communicating with other elements of system 100.

In some implementations, the security analytics platform 120 may include one or more computing devices (such as a rackmount server, a router computer, a server computer, a personal computer, a mainframe computer, a laptop computer, a tablet computer, a desktop computer, etc.), data structures (e.g., hard disks, memories, databases), networks, software components, or hardware components that can be used to provide the client device 110 with, for example, the contextual threat detection information that is stored in the entity context data structure 106. Such computing devices can be positioned in a single location or can be distributed among many different geographical locations. For example, the security analytics platform 120 can include a plurality of computing devices that comprise a hosted computing resource, a grid computing resource, and/or any other distributed computing arrangement. In some implementations, the security analytics platform 120 can correspond to an elastic computing resource where the allotted capacity of processing, network, storage, or other computing-related resources may vary over time.

In some implementations, the security analytics platform 120 can include one or more features for analyzing the entity context data structure 106. The security analytics platform 120 can include one or more security data ingestion points for accessing the entity context data structure 106. In some implementations, collecting the entity context data structure 106 from the one or more security data ingestion points can be an automated process and/or a partially automated process.

The security analytics platform 120 can implement an engine 141, such as a rule engine. In some implementations, the user can provide to the engine 141 security response parameters (e.g., security rule(s) 142) for performing security remediation actions based on the data stored in the entity context data structure 106 and based on telemetry data pertaining to the entities associated with the organization. In some implementations, the user can provide to the engine 141 metadata pertaining to the security response parameters (e.g., security rule(s) metadata 143). The security rule(s) metadata 143 can include one or more of data type identifiers, rule type identifiers, specific rule identifiers, outcome type identifiers, data labels, rule labels, or the like.

The engine 141 can use the security rule(s) 142 to perform threat detection (e.g., to detect threats that are facing the enterprise computing environment). In some implementations, the engine 141 can process additional inputs, including the security rule(s) metadata 143, and the security rule outcome(s) 144 from previous threat detection analyses. Responsive to detecting one or more security threats facing the enterprise computing environment, the engine 141 can output the one or more detected security threats (e.g., security rule outcome(s) 144). The engine 141 can determine one or more security remediation actions to be performed in response to the security rule outcome(s) 144. Responsive to detecting one or more security threats, the security alert module 131 can generate one or more alerts that include the security rule outcome(s) 144. The alerts can be transmitted to the users associated with the enterprise computing environment (e.g., via the client device 110).

The engine 141 can include or interface with a GUI (e.g., UI 112) to provide users of the client device 110 with a user interface for configuring one or more parameters of the engine 141. In some implementations, the engine 141 can include or access an artificial intelligence (AI) model (e.g., a machine learning model) for performing threat detection. The AI model can include a discriminative AI model, a generative AI model, and/or other AI models. A discriminative AI model can model a conditional probability of an output for given input(s). A discriminative AI model can learn the boundaries between different classes of data to make predictions on new data. In some implementations, a discriminative AI model can include a classification model that is designed for classification tasks, such as learning decision boundaries between different classes of data and classifying input data into a particular classification. Examples of discriminative AI models include, but are not limited to, support vector machines (SVM) and neural networks.

In some implementations, a generative AI model learns the hidden relationships in the input training data and can generate new data (e.g., original data). A generative AI model can model the probability distribution (e.g., joint probability distribution) of a dataset and generate new samples that often resemble the training data. Generative AI models can be used for tasks involving image generation, text generation and/or data synthesis. Generative AI models include, but are not limited to, gaussian mixture models (GMMs), variational autoencoders (VAEs), generative adversarial networks (GANs), large language models (LLMs), vision-language models (VLMs), multi-modal models (e.g., text, images, video, audio, depth, physiological signals, etc.), and so forth.

In some implementations, server machine 130 and server machine 140 can be one or more computing devices (such as a rackmount server, a router computer, a server computer, a personal computer, a mainframe computer, a laptop computer, a tablet computer, a desktop computer, etc.), data structures (e.g., hard disks, memories, databases), networks, software components, or hardware components that can be used to provide a user with access to one or more data items of the security analytics platform 120.

In some implementations, one or more of the server machine 130 or the server machine 140 can be part of the security analytics platform 120. In other implementations, one or more of the server machine 130 or the server machine 140 can be separate from security analytics platform 120 (e.g., provided by a third-party service provider).

In general, functions described in implementations as being performed by security analytics platform 120, server machine 130, and/or server machine 140 can also be performed on the client device 110 in other implementations, if appropriate. In addition, the functionality attributed to a specific component can be performed by different or multiple components operating together.

In some implementations, a "user" can be represented as a single individual. For example, a user of the client device 110. However, in some implementations, a "user" can be an entity controlled by a set of users and/or an automated source (e.g., an organization). For example, a set of individual users federated as a community in a social network can be considered a "user." In another example, an automated consumer can be an automated ingestion pipeline of security analytics platform 120.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a specific location of a user cannot be determined. Thus, the user can have control over what information is collected about the user, how that information is used, and what information is provided to the user.

Figure 2:
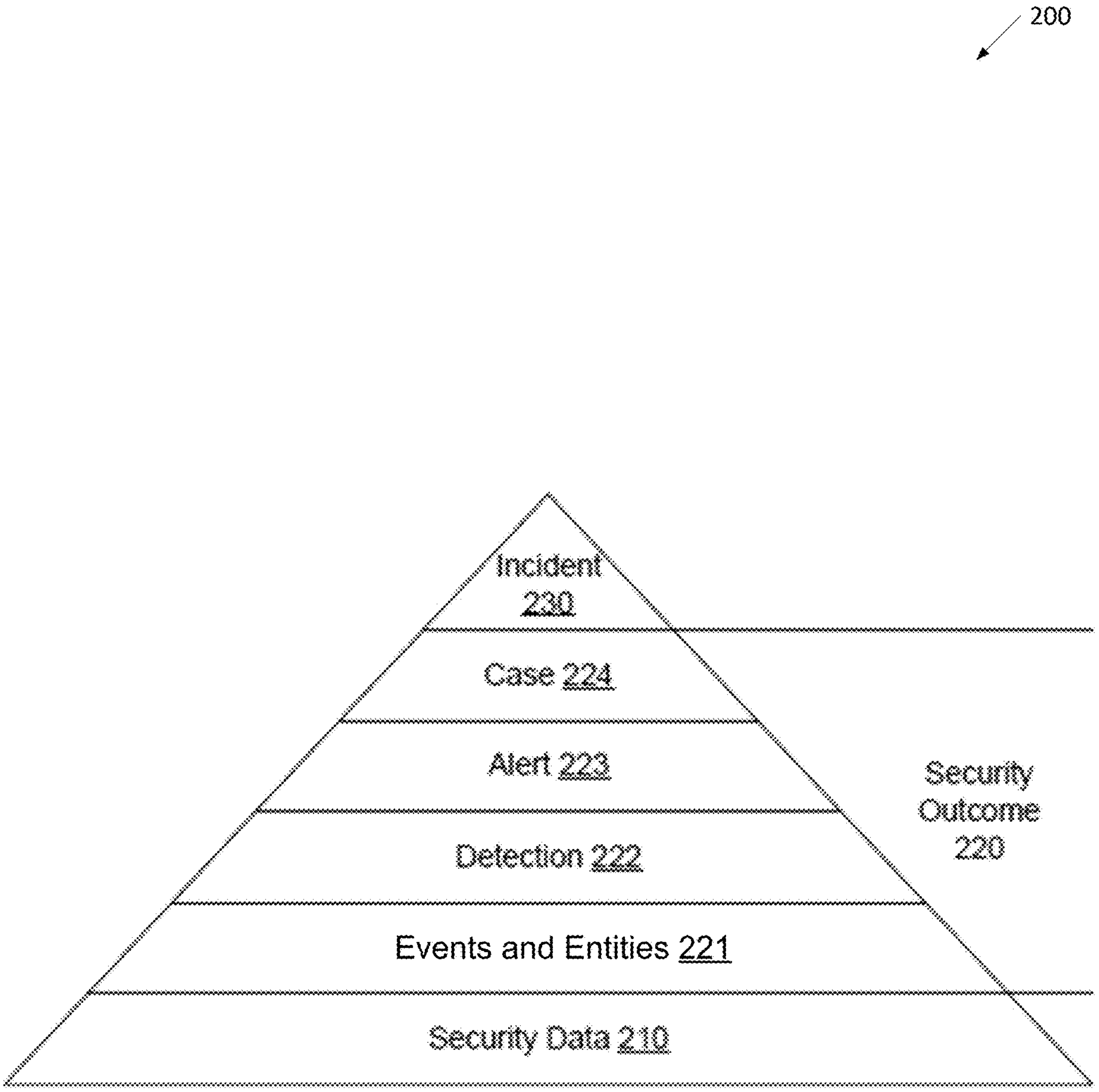
FIG. 2 depicts an example illustration of a security taxonomy, in accordance with implementations of the present disclosure.

FIG. 2 is an example illustration of a security taxonomy 200, in accordance with aspects of the disclosure. Security taxonomy 200 includes security data 210, events and entities 221, detection 222, alert 223, case 224, and incidents 230. As used herein, security outcome 220 can include one or more of events and entities 221, a detection 222, an alert 223, or a case 224. Generally, incidents 230 can refer to any of one or more of events and entities 221, a detection 222, an alert 223, or a case 224 that exceeds a threat-level threshold condition, as defined by the security analytics platform and/or an organization using the security analytics platform. In some implementations, security outcome 220 can include incidents 230. It can be appreciated that the security taxonomy 200 is included herein to provide examples of "security outcomes" (e.g., security outcome 220), which are meant to be an inclusive representation, rather than an exclusive representation.

Security data 210 can include all data generated by an organization that is sent to a security analytics platform (e.g., security analytics platform 120) for processing (e.g., ingested data). As described above, security data 210 can include telemetry data. The security analytics platform can process the security data 210 using one or more security rules. A security rule is a defined set of criteria and instructions used to process the security data (and/or outcomes from other security rules). Security data 210 can be processed by a security rule into a security outcome 220, which can include one or more events and entities 221, a detection 222, an alert 223, or a case 224. In some implementations, once security data 210 is processed by a security rule, the resulting data is a security outcome 220 (e.g., one of events and entities 221, a detection 222, an alert 223, or a case 224), or an incident 230.

The security analytics platform can process the events and entities 221 using one or more security rules. Events and entities 221 can refer to security data 210 that has been processed to include additional context or significance that indicates a noticeable change in the state of a computing system. In some implementations, the additional context or significance can be included or represented as a label or tag. In some implementations, the additional context or significance can be added as metadata to the processed security data (e.g., security data 210) to generate the events and entities 221. In some implementations, multiple sets of security data 210 can be processed by a single security rule to generate the events and entities 221. Events and entities 221 can be processed by a security rule into another security outcome 220, including one or more of another security event (e.g., events and entities 221), a detection 222, an alert 223, or a case 224. In some implementations, events and entities 221 can be processed into an incident 230.

The security analytics platform can process the detection 222 using one or more security rules. A detection 222 can refer to an object that is generated from matched or correlated security events (e.g., events and entities 221) that pertain to an indication, or potential indication of a security threat. A detection 222 can include an analytical assessment of events and entities 221, and/or security data 210. In some implementations, data used to generate the detection 222 (e.g., security data 210, events and entities 221, another detection, etc.) can be matched or correlated by an algorithm or machine learning model. In some implementations, the detection 222 can be generated from a security rule based on security data 210. In some implementations, the detection 222 can be generated from a security rule based on events and entities 221 and security data 210. Detection 222 can be processed by a security rule into another security outcome 220, including one or more of another security detection (e.g., a detection 222), an alert 223 or a case 224. In some implementations, detection 222 can be processed into an incident 230.

The security analytics platform can process the alert 223 using one or more security rules. An alert 223 can refer to a security outcome 220 that satisfies an alert threshold criterion. An alert 223 can be a detection 222 that satisfies the alert threshold criterion. In some implementations, the security outcome 220 can satisfy an alert threshold based on one or more characteristics of the security outcome 220. Characteristics of security outcomes 220 can be reflected in metadata associated with the security outcome 220. In some implementations, a security rule can process one or more of security data 210, events and entities 221, a detection 222, or other alert 223 to determine whether the processed data satisfies the alert threshold. An alert 223 can be processed by a security rule into another security outcome 220, including one or more of another security alert (e.g., an alert 223) or a case 224. In some implementations, the alert 223 can be processed into an incident 230.

The security analytics platform can process the case 224 using one or more security rules. A security case (e.g., case 224) can refer to a collection of one or more security alerts (e.g., alert 223), detections (e.g., detection 222), events and entities (e.g., events and entities 221), and/or security data 210 that have one or more of the same or similar characteristics (e.g., metadata). In some implementations, case 224 can be grouped based on temporal characteristics. For example, security outcomes 220 and security data 210 can be grouped into case 224 based on an access time, or processing time associated with the security outcomes 220 or security data 210. Case 224 can be processed by a security rule into another security outcome 220 such as another security case (e.g., case 224). In some implementations, the case 224 can be processed into an incident 230.

The security analytics platform can process an incident 230 based on one or more security rules. An incident 230 can refer to a security outcome 220 that meets one or more criteria for investigation. In some implementations, the investigation that is triggered for the incident 230 can be a manual investigation by security researchers. In some implementations, the investigation that is triggered for the incident 230 can be an automated or semi-automated investigation using one or more of security investigation algorithms, artificial intelligence (AI) models, or the like.

As described herein with reference to FIG. 2, a security outcome 220 can include one or more of events and entities 221, a detection 222, an alert 223, or a case 224. In some implementations, a security outcome 220 can include an incident 230. Security outcomes 220 can be generated by one or more security rules that process one or more of security data 210, events and entities 221, a detection 222, an alert 223, or a case 224. For example, a security rule can process the security data 210, a detection 222, and an alert 223 to generate a security outcome 220. In another example, a security rule can process a detection 222 to generate a security outcome 220. In another example, a security rule can process the security data 210 to generate a security outcome 220. In some implementations, security outcomes 220 can be generated by security rules that additionally process data from an incident 230. For example, a security outcome 220 (e.g., a security detection) can be obtained by processing the security data 210 and a detection 222 on a security analytics platform using a security rule. In another example, a security outcome 220 (e.g., a security event) can be obtained by processing the security data 210 and events and entities 221. In another example, a security outcome 220 (e.g., a security alert) can be obtained by processing the events and entities 221, the detection 222, and the alert 223. Thus, it can be appreciated that security rules can operate on security data 210 and any of security outcomes 220 to produce another security outcome 220. In some implementations, security outcomes 220 of a lower tier on the security taxonomy 200 are processed by a security rule to generate security outcomes 220 of the same, or a higher tier. For example, events and entities 221 and detection 222 can be processed by a security rule to generate additional detection 222, or alert 223.

Figure 3:
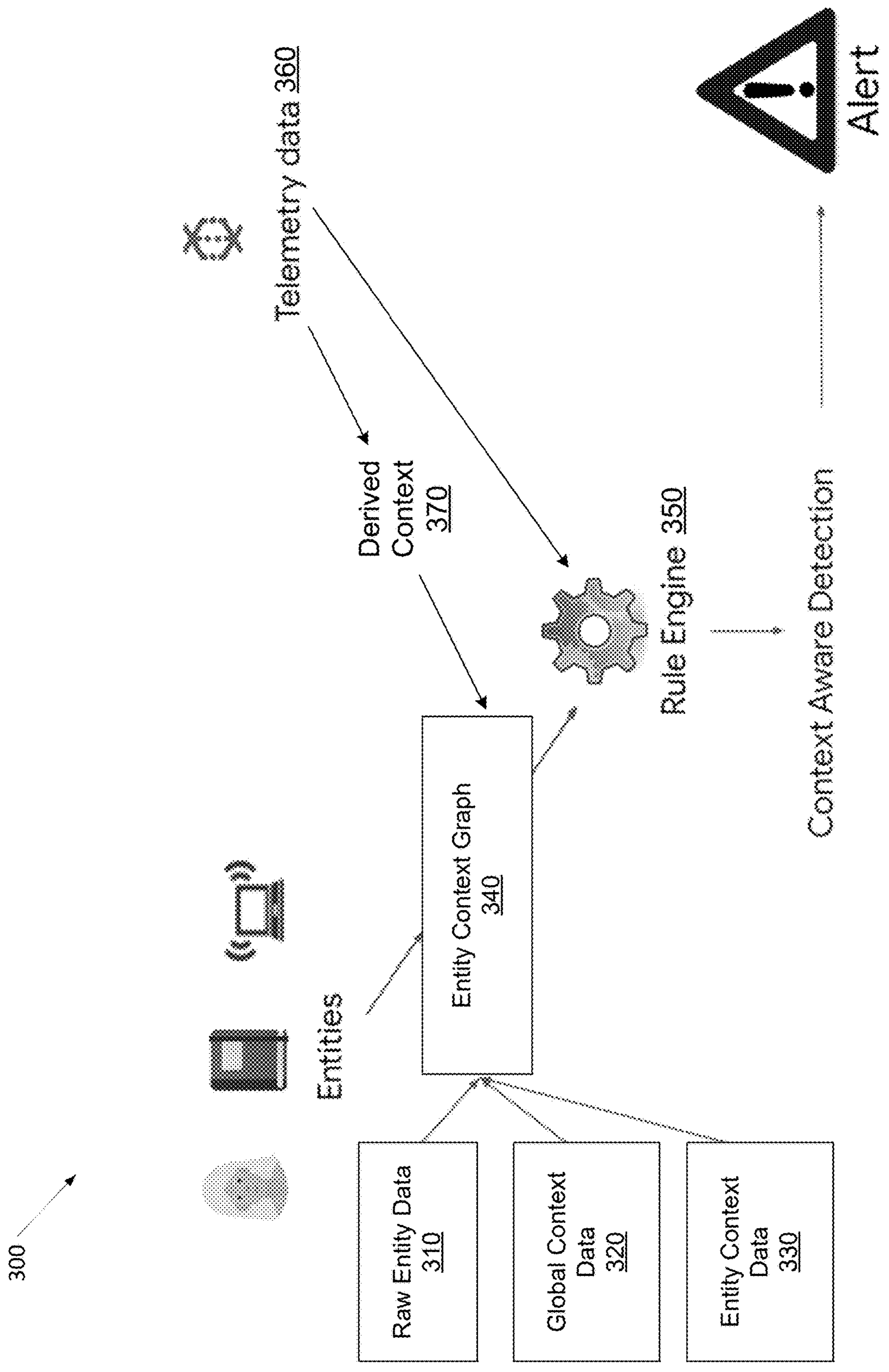
FIG. 3 depicts an example entity context data generation module for entity context-based security threat detection by a security analytics platform, in accordance with implementations of the present disclosure.

FIG. 3 depicts an example entity context data generation module 300 for entity context-based security threat detection by a security analytics platform. The entity context data generation module 300 can receive a plurality of heterogeneous data items from a plurality of data sources. The plurality of heterogeneous data items can include raw entity data 310, which can include data items pertaining to a plurality of entities associated with, for example, an enterprise computing environment. In some implementations, the raw entity data 310 can be generated in an enterprise computing environment that is associated with one or more entities. In some implementations, the plurality of heterogeneous data items can include global context data 320, such as global security threat intelligence data, which can include security operations data items that are associated with one or more entities, security intelligence data items that are associated with one or more entities. The security intelligence data items that are associated with one or more entities can include security detections that identify potential security threats, a security watch list, a security breach indicator, an investigation operation, one or more remediation operations, etc. In some implementations, the plurality of heterogeneous data items can include informational data items that are associated with one or more entities. In some implementations, the entity context data generation module 300 can receive the global context data 320 from one or more global threat intelligence data repositories.

Figure 4:
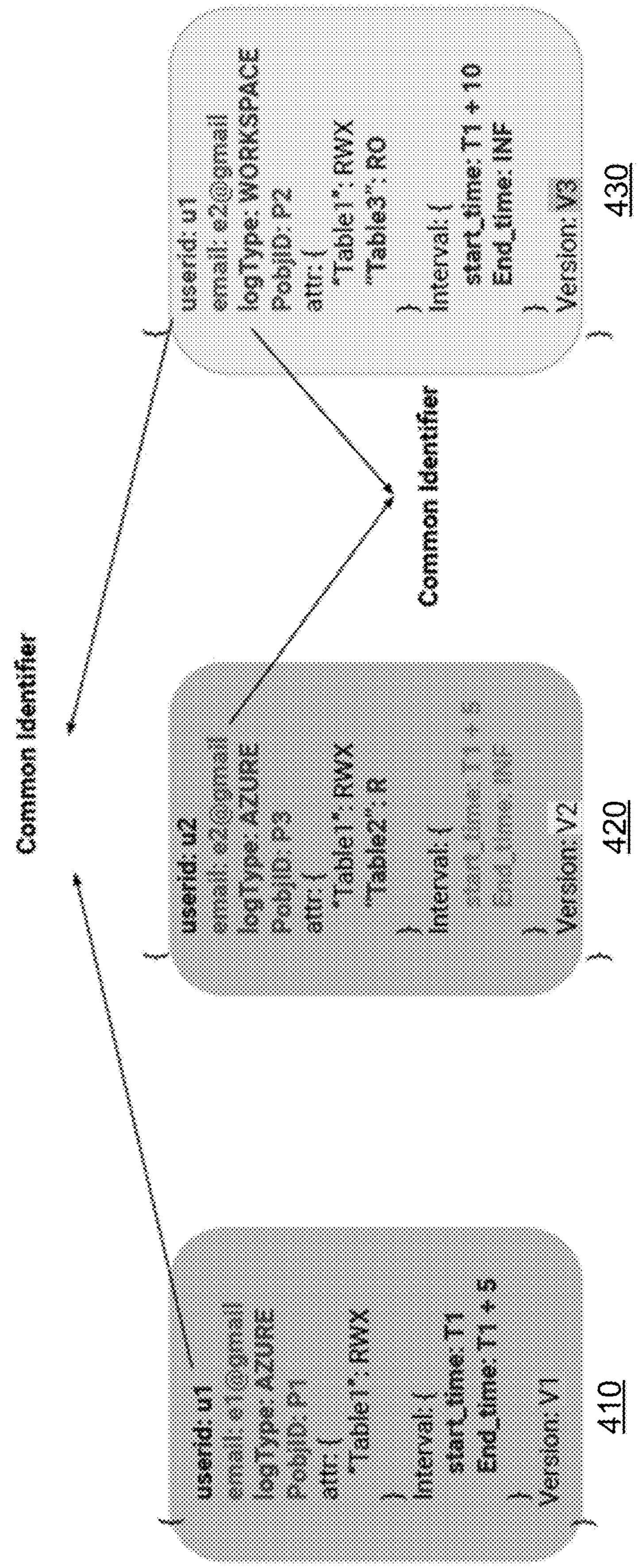
FIG. 4 depicts example log files containing heterogeneous data items, in accordance with implementations of the present disclosure.

In some implementations, a log file can contain one or more heterogeneous data items. FIG. 4 depicts example log files containing heterogeneous data items, such as raw entity data. Log files 410 and 430 contain raw entity data pertaining to an entity associated with userID u1, while log file 420 contains raw entity data pertaining to an entity associated with userID u2. In some implementations, log files 410, 420, and 430 can contain data that indicates the relationship(s) between the entities. For example, the entities associated with log files 420 and 430 can correspond to the same email address even though each entity corresponds to a different userID. As such, the raw entity data in log files 420 and 430 can indicate that the entity associated with userID u1 and the entity associated with userID u2 are each associated with a common entity, such as a common email address.

Figure 5:
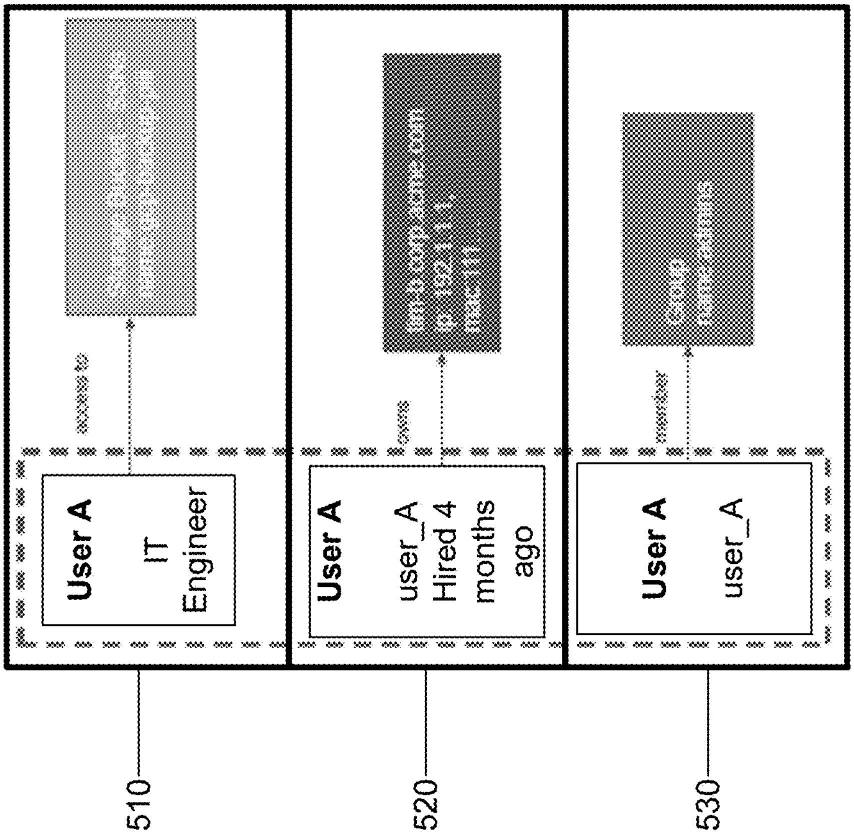
FIG. 5 depicts an example log file containing heterogeneous data items, in accordance with implementations of the present disclosure.

FIG. 5 depicts an example log file containing heterogeneous data items, such as raw entity data. As illustrated in FIG. 5, a log file can identify one or more entities with which a first entity interacts with, owns, is a member of, etc. For example, log files 510, 520, and 530 indicate that User A has access to a specific storage bucket, owns a specific network address, and is a member of a specific group.

In some implementations, the log files associated with each entity of an enterprise computing environment can be used to generate an entity context data structure.

Figure 6:
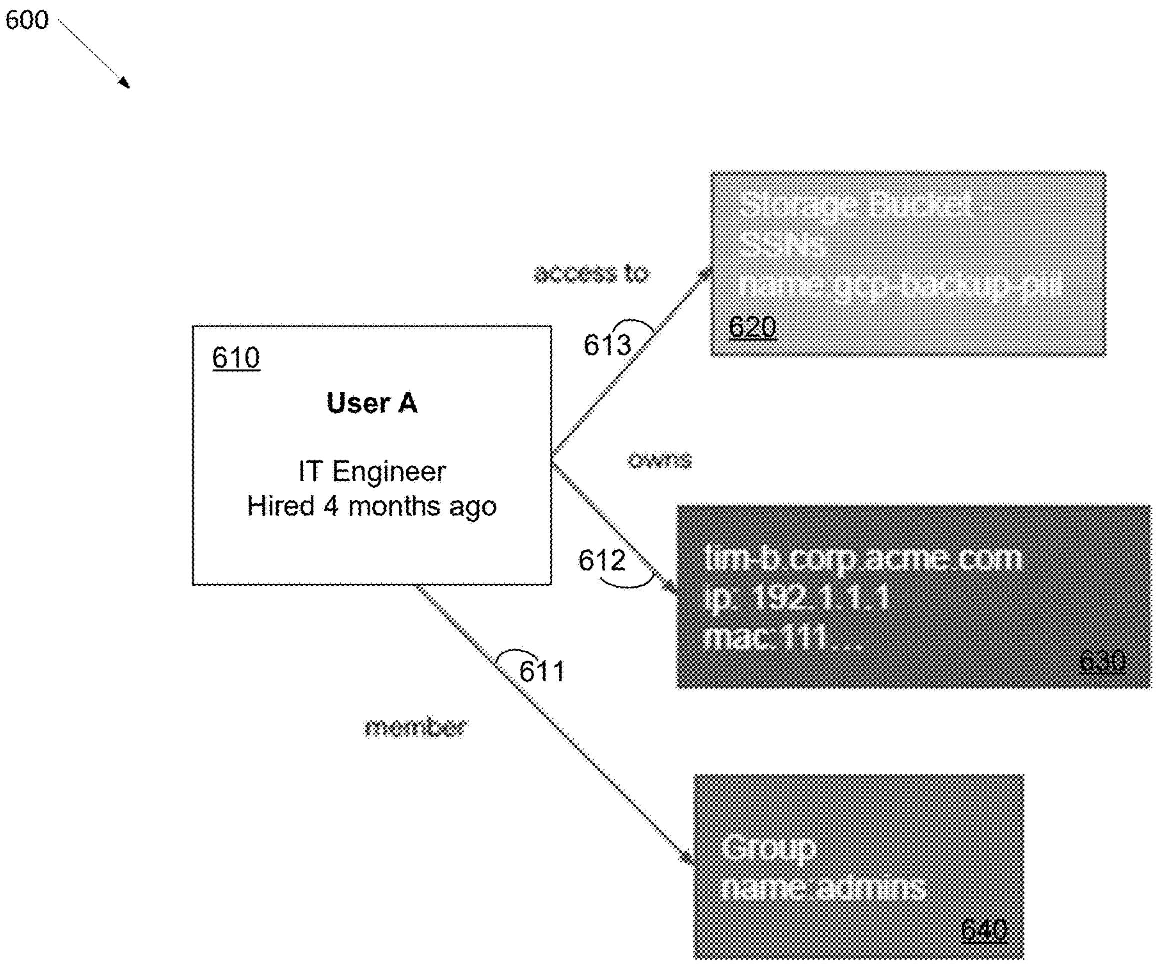
FIG. 6 depicts an example entity context data structure, in accordance with implementations of the present disclosure.

FIG. 6 depicts an example entity context data structure 600. Vertices 610, 620, 630, and 640 each represent distinct entities associated with an enterprise computing environment. Edges 611, 612, and 613 represent the relationships between vertices 610 and 640, 610 and 630, and 610 and 620, respectively. The data that is represented via entity context data structure 600 represents the coalesced data of each of log files 510, 520, and 530, as illustrated in FIG. 5.

Figure 7:
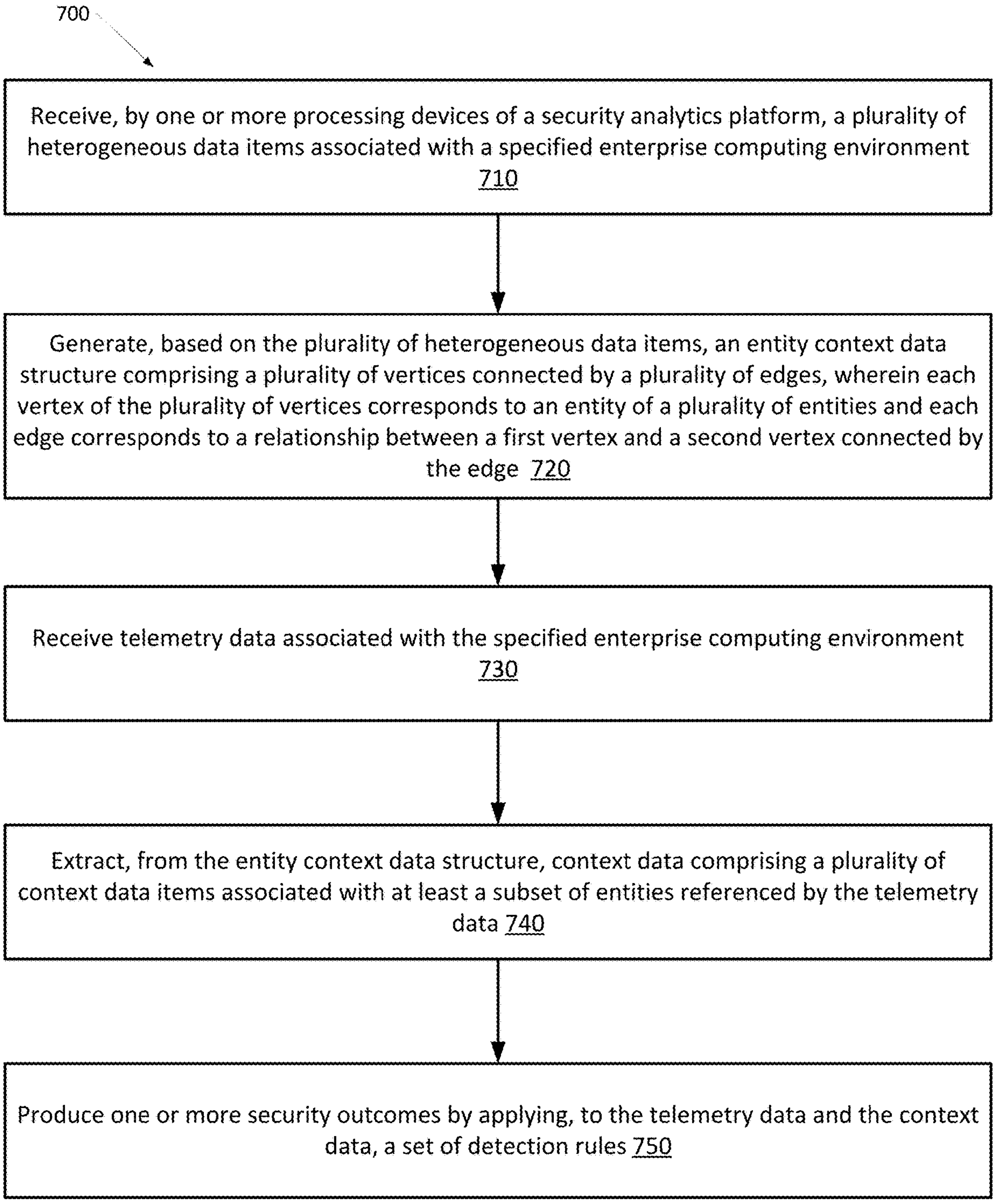
FIG. 7 depicts a flow diagram of a method for entity context-based security threat detection by a security analytics platform, in accordance with implementations of the present disclosure.

FIG. 7 depicts a flow diagram of a method for generating entity context data structures for threat detection in a security analytics platform, in accordance with implementations of the present disclosure. Method 700 may be performed by processing logic that may include hardware (circuitry, dedicated logic, etc.), software (e.g., instructions run on a processing device), or a combination thereof. In one implementation, some or all the operations of method 700 may be performed by the contextual data generation module 146 and/or security analytics platform 120 of FIG. 1.

At operation 710, the processing logic can receive, by one or more processing devices of a security analytics platform, a plurality of heterogeneous data items associated with a specified enterprise computing environment. The plurality of heterogenous data items can be stored in one or more log files that each contain raw entity data that pertains to an entity associated with an organization. Each data item can be raw entity data that corresponds to a different organization entity. In some implementations, multiple data items can include the same raw entity data that pertains to the same entity (e.g., duplicate raw entity data). The processing logic can determine whether one or more log files contain raw entity data that pertains to the same entity.

Based on determining that one or more log files contain raw entity data that pertains to the same entity, the processing logic can coalesce all of the raw entity data that pertains to the entity (e.g., merge portions of the plurality of heterogeneous data items that pertain to the same entity into a single log file). The processing logic can determine whether the raw entity data contains instances of duplicate raw entity data. Based on determining that the raw entity data pertaining to the entity contains duplicate raw entity data, the processing logic can perform a data de-duplication operation on the raw entity data.

In some implementations, the processing logic can use the raw entity data that pertains to the entity (e.g., the raw entity data 310 of FIG. 3) and the global security threat intelligence data (e.g., the global context data 320 of FIG. 3) to generate the contextual threat detection information that pertains to the entity (e.g., entity context data 330 of FIG. 3). In some implementations, the processing logic can use the raw entity data 310 to derive, for each entity, a state of the entity over a period of time, actions that the entity executes over a period of time, actions that the entity experiences over a period of time, etc. In some implementations, the processing logic can use the global context data 320 to determine one or more threat intelligence metrics pertaining to the entity (e.g., IOCs facing the entity, IOCs facing the enterprise computing environment, etc.).

At operation 720, the processing logic can generate, based on the plurality of heterogeneous data items, an entity context data structure comprising a plurality of vertices connected by a plurality of edges. Each vertex of the plurality of vertices can correspond to an entity of a plurality of entities and each edge can correspond to a relationship between a first vertex and a second vertex connected by the edge.

The processing logic can perform threat detection using the entity context data structure and one or more rule engines (e.g., rule engine 350 of FIG. 3). At operation 730, the processing logic can receive telemetry data associated with the specified enterprise computing environment. For example, the processing logic can receive real-time telemetry data (e.g., telemetry data 360 of FIG. 3) that pertains to the entities. In some implementations, the processing logic can also receive contextual data that is derived from the telemetry data 360, such as derived context 370. In some implementations, the processing logic can also receive one or more security parameters for performing threat detection. The one or more security parameters can describe entity states, actions, and/or experiences that, when detected, suggest that the entity experienced a performance anomaly (e.g., the actual entity state, action, and/or experience of the entity differs from an expected entity state, action, and/or experience). Based on one or more of the received telemetry data, the contextual data that is derived from the telemetry data, and the security parameters, the processing logic can monitor entity behavior to detect one or more security threats.

At operation 740, the processing logic can extract, from the entity context data structure, context data comprising a plurality of context data items associated with at least a subset of entities referenced by the telemetry data. Specifically, the processing logic can identify, for each detected security threat, contextual threat detection information that pertains to the entity (or entities) that are associated with the detected security threat. In some implementations, the contextual threat detection information can include a state of the entity (or the entities) prior to the detected security threat, during the detected security threat, and/or following the detected security threat. In some implementations, the contextual threat detection information can indicate one or more actions performed by the entity prior to the detected security threat, during the detected security threat, and/or following the detected security threat. In some implementations, the contextual threat detection information can indicate one or more actions that the entity experienced prior to the detected security threat, during the detected security threat, and/or following the detected security threat.

At operation 750, the processing logic can produce one or more security outcomes by applying, to the telemetry data and the context data, a set of detection rules. In some implementations, the set of detection rules can include the security parameters that the processing logic receives from the organization. Specifically, the set of detection rules can include parameters for determining whether actual entity behavior differs from expected entity behavior. In some implementations, the set of the detection rules can include an indication of the expected entity behavior. A security outcome can include an indication of the one or more detected security threats, an event within the specified enterprise computing environment, an alert, a remedial action, etc. In some implementations, the processing logic can generate one or more alerts that indicate the detected security threat(s) and the context data pertaining to each detected security threat. In some implementations, the processing logic can transmit the one or more alerts to the organization to enable the organization to, for example, analyze and/or remedy the detected security threats.

Figure 8:
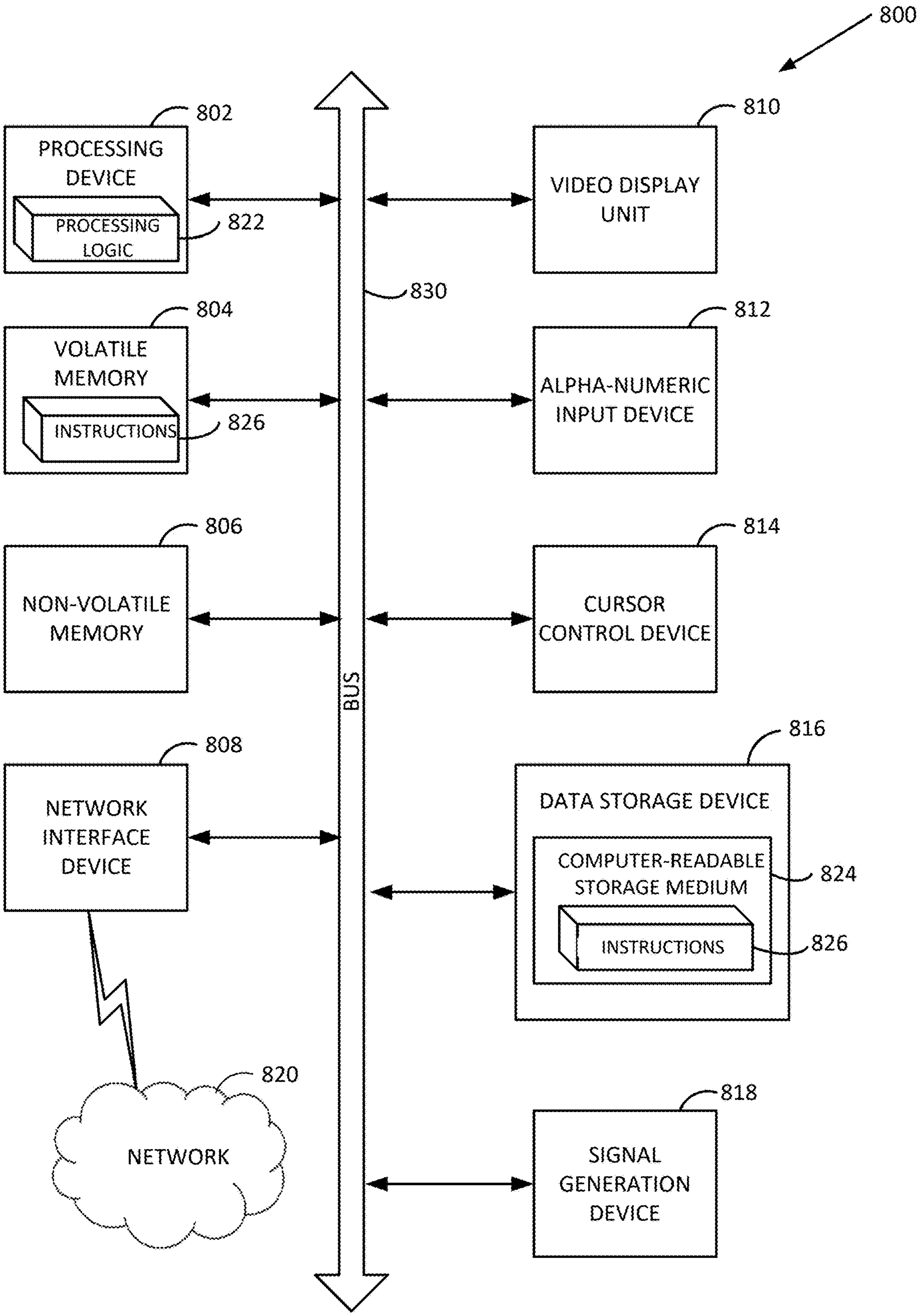
FIG. 8 depicts an example block diagram illustrating an example computer system, in accordance with implementations of the present disclosure.

FIG. 8 is a block diagram illustrating an example computer system 800, in accordance with implementations of the present disclosure. Computer system 800 can operate in the capacity of a server or an endpoint machine in endpoint-server network environment, or as a peer machine in a peer-to-peer (or distributed) network environment. The machine can be a television, a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processing device (processor) 802, a volatile memory 804 (e.g., read-only memory (ROM), flash memory, dynamic random access memory (DRAM) such as synchronous DRAM (SDRAM), double data rate (DDR SDRAM), or DRAM (RDRAM), etc.), a non-volatile memory 806 (e.g., flash memory, static random access memory (SRAM), etc.), and a data storage device 816, which communicate with each other via a bus 830.

Processor (processing device) 802 represents one or more general-purpose processing devices such as a microprocessor, central processing unit, or the like. More particularly, the processor 802 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 802 can also be one or more special-purpose processing devices such as an application specific integrated circuit (ASIC), a field programmable gate array (FPGA), a digital signal processor (DSP), network processor, or the like. The processor 802 is configured to execute processing logic 822 for performing the operations discussed herein.

The computer system 800 can further include a network interface device 808. The computer system 800 also can include a video display unit 810 (e.g., a liquid crystal display (LCD) or a cathode ray tube (CRT)), an input device 812 (e.g., a keyboard, and alphanumeric keyboard, a motion sensing input device, touch screen), a cursor control device 814 (e.g., a mouse), and a signal generation device 818 (e.g., a speaker).

The data storage device 816 can include a non-transitory machine-readable storage medium 824 (also computer-readable storage medium) on which is stored one or more sets of instructions 826 embodying any one or more of the methodologies or functions described herein. The instructions can also reside, completely or at least partially, within the volatile memory 804 and/or within the processor 802 during execution thereof by the computer system 800, the volatile memory 804 and the processor 802 also constituting machine-readable storage media. The instructions can further be transmitted or received over a network 820 via the network interface device 808.

In one implementation, the instructions 826 include instructions for providing fine-grained version histories of electronic documents at a platform. While the computer-readable storage medium 824 (machine-readable storage medium) is shown in an example implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media.

Reference throughout this specification to "one implementation," or "an implementation," means that a particular feature, structure, or characteristic described in connection with the implementation is included in at least one implementation. Thus, the appearances of the phrase "in one implementation," or "in an implementation," in various places throughout this specification can, but are not necessarily, referring to the same implementation, depending on the circumstances. Furthermore, the particular features, structures, or characteristics may be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, circuits, modules, and so on have been described with respect to interact between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Finally, implementations described herein include collection of data describing a user and/or activities of a user. In one implementation, such data is only collected upon the user providing consent to the collection of this data. In some implementations, a user is prompted to explicitly allow data collection. Further, the user may opt-in or opt-out of participating in such data collection activities. In one implementation, the collected data is anonymized prior to performing any analysis to obtain any statistical patterns so that the identity of the user cannot be determined from the collected data.

What is claimed is:

1. A method, comprising:

receiving, by one or more processing devices of a security analytics platform, a plurality of heterogeneous data items associated with a specified enterprise computing environment;

cross-validating a first subset of the plurality of heterogeneous data items and a second subset of the plurality of heterogeneous data items;

generating, based on the plurality of heterogeneous data items, an entity context data structure comprising a plurality of vertices connected by a plurality of edges, wherein each vertex of the plurality of vertices corresponds to an entity of a plurality of entities and each edge corresponds to a relationship between a first vertex and a second vertex connected by the edge;

receiving telemetry data associated with the specified enterprise computing environment;

extracting, from the entity context data structure, context data comprising a plurality of context data items associated with at least a subset of the entities referenced by the telemetry data; and producing one or more security outcomes by applying, to the telemetry data and the context data, a set of detection rules.

2. The method of claim 1, wherein the one or more security outcomes comprise at least one of:

a detection of a potential security threat;

an event within the specified enterprise computing environment;

an alert; or a remedial action.

3. The method of claim 1, further comprising:

generating, based on the one or more security outcomes, one or more alerts.

4. The method of claim 1, wherein the plurality of heterogeneous data items comprises at least one of:

a log data item associated with one or more entities of the specified enterprise computing environment;

a security operations data item associated with the one or more entities of the specified enterprise computing environment;

a security intelligence data item associated with the one or more entities of the specified enterprise computing environment; or an informational data item associated with the one or more entities of the specified enterprise computing environment.

5. The method of claim 4, wherein the security intelligence data item characterizes at least one of:

a security detection identifying a potential security threat;

a security watch list;

a security breach indicator;

an investigation operation; or one or more remediation operations.

6. The method of claim 1, wherein generating the entity context data structure further comprises:

de-duplicating a subset of the plurality of heterogeneous data items associated with a specified entity.

7. The method of claim 1, wherein generating the entity context data structure further comprises:

merging a subset of the plurality of heterogeneous data items associated with a specified entity.

8. The method of claim 1, wherein generating the entity context data structure further comprises:

validating a subset of the plurality of heterogeneous data items.

9. A system comprising:

a memory; and a processing device, coupled to the memory, configured to perform operations comprising:

receiving a plurality of heterogeneous data items associated with a specified enterprise computing environment;

cross-validating a first subset of the plurality of heterogeneous data items and a second subset of the plurality of heterogeneous data items;

generating, based on the plurality of heterogeneous data items, an entity context data structure comprising a plurality of vertices connected by a plurality of edges, wherein each vertex of the plurality of vertices corresponds to an entity of a plurality of entities and each edge corresponds to a relationship between a first vertex and a second vertex connected by the edge;

receiving telemetry data associated with the specified enterprise computing environment;

extracting, from the entity context data structure, context data comprising a plurality of context data items associated with at least a subset of the entities referenced by the telemetry data; and producing one or more security outcomes by applying, to the telemetry data and the context data, a set of detection rules.

10. The system of claim 9, wherein the processing device is further configured to perform operations comprising:

generating, based on the one or more security outcomes, one or more alerts.

11. The system of claim 9, wherein generating the entity context data structure further comprises:

de-duplicating a subset of the plurality of heterogeneous data items associated with a specified entity.

12. The system of claim 9, wherein generating the entity context data structure further comprises:

merging a subset of the plurality of heterogeneous data items associated with a specified entity.

13. The system of claim 9, wherein generating the entity context data structure further comprises:

validating a subset of the plurality of heterogeneous data items.

14. A non-transitory computer readable storage medium comprising instructions that, when executed by a processing device, cause the processing device to perform operations comprising:

receiving a plurality of heterogeneous data items associated with a specified enterprise computing environment;

cross-validating a first subset of the plurality of heterogeneous data items and a second subset of the plurality of heterogeneous data items;

generating, based on the plurality of heterogeneous data items, an entity context data structure comprising a plurality of vertices connected by a plurality of edges, wherein each vertex of the plurality of vertices corresponds to an entity of a plurality of entities and each edge corresponds to a relationship between a first vertex and a second vertex connected by the edge;

receiving telemetry data associated with the specified enterprise computing environment;

extracting, from the entity context data structure, context data comprising a plurality of context data items associated with at least a subset of the entities referenced by the telemetry data; and producing one or more security outcomes by applying, to the telemetry data and the context data, a set of detection rules.

15. The non-transitory computer readable storage medium of claim 14, wherein the instructions, when executed, further cause the processing device to perform operations comprising:

generating, based on the one or more security outcomes, one or more alerts.

16. The non-transitory computer readable storage medium of claim 14, wherein generating the entity context data structure further comprises:

merging a subset of the plurality of heterogeneous data items associated with a specified entity.

17. The non-transitory computer readable storage medium of claim 14, wherein generating the entity context data structure further comprises:

validating a subset of the plurality of heterogeneous data items.

* * * * *